United States Patent [19]
Ovard

[11] Patent Number: 4,578,227
[45] Date of Patent: Mar. 25, 1986

[54] SPLASH BAR METHOD AND APPARATUS
[76] Inventor: John C. Ovard, 3465 Ridgeview Dr., Santa Rosa, Calif. 95404
[21] Appl. No.: 590,068
[22] Filed: Mar. 15, 1984
[51] Int. Cl.⁴ ............................................... B01F 3/04
[52] U.S. Cl. ............................ 261/111; 261/DIG. 11
[58] Field of Search ........ 261/111, DIG. 11, DIG. 72
[56] References Cited

U.S. PATENT DOCUMENTS

| | | | |
|---|---|---|---|
| 2,497,389 | 2/1950 | Ahrens | 261/111 |
| 2,739,118 | 3/1956 | Carey | 261/DIG. 72 |
| 2,783,982 | 3/1957 | Kahl | 261/DIG. 11 |
| 2,791,408 | 5/1957 | Lewis | 261/DIG. 11 |
| 2,809,818 | 10/1957 | Munters | 261/24 |
| 2,986,379 | 5/1961 | Kramig, Jr. | 261/28 |
| 3,262,682 | 7/1966 | Bredberg | 261/29 |
| 3,272,484 | 9/1966 | Brand et al. | 261/24 |
| 3,389,895 | 6/1968 | De Flon | 261/111 |
| 3,468,521 | 9/1969 | Furlong et al. | 261/111 |
| 3,647,191 | 3/1972 | Fordyce | 261/111 |
| 3,758,088 | 9/1973 | Fordyce | 261/111 |
| 3,804,389 | 4/1974 | Engalitcheff, Jr. | 261/DIG. 11 |
| 4,020,130 | 4/1977 | Ovard | 261/111 |
| 4,117,049 | 9/1978 | Carrico | 261/111 |
| 4,133,851 | 1/1979 | Ovard | 261/111 |
| 4,181,691 | 1/1980 | Cates | 261/111 |

Primary Examiner—Richard L. Chiesa
Attorney, Agent, or Firm—Limbach, Limbach & Sutton

[57] ABSTRACT

An improved splash bar method and apparatus are described employing elongate splash bars each having a substantially flat, perforated upper central strip and a pair of substantially flat perforated lower strips connected to the central strip by elongate vertical strips holding the upper and lower strips in parallel, vertically spaced apart relation. Circular perforations are arranged in staggered rows with semicircular holes in alternate rows along the edges of the strips. The upper strip has imperforate strips along its lateral edges.

7 Claims, 7 Drawing Figures

SPLASH BAR METHOD AND APPARATUS

DESCRIPTION

1. Field of the Invention

The present invention relates to an improved method and apparatus for promoting heat transfer in a direct contact heat exchange apparatus designed for cross current flow relationship between a liquid and a gas.

2. Background of the Invention

There are a number of industrial processes wherein a liquid and a gas are brought into direct contact with each other for the purpose of effecting a transfer of heat from one fluid to the other. The efficiency with which this direct contact heat transfer process occurs, is primarily dependent on the amount of liquid surface area that comes into contact with the gas. Most of the apparatus specifically designed for this type of process employ some physical means, commonly called a heat transfer media or fill assembly, whose primary purpose is to promote the generation of liquid surface. Closely associated with this is the ability of the media to uniformly distribute the two fluids on media surfaces and/or throughout the media section and to assure they intimately mix while increasing fluid contact time as much as possible. This is accomplished by either promoting the generation of liquid droplets by means of a splash bar type heat transfer media or by promoting the generation of thin liquid films on the surface of a cellular structure, commonly called a film type heat transfer media. Clearly this distinction relates only to the primary means of creating liquid surface area since splash type packings will generate some liquid films and visa versa.

In either type of heat transfer media, both the liquid and gas are in a constantly changing dynamic state and individual and distinct elements of each fluid interact with adjacent elements of their own kind, elements of the other fluid, and with the heat transfer media, in a complex way. While a researcher may be able to isolate and analyze certain fundamental elements in this complex process and thereby gain a scientifically measurable understanding of what is important, there is no known precise way to evaluate the complex interactive phenomenia that actually occurs between the fluids and the heat transfer media and to predict performance superiority for a given media geometry as compared to others. Thus one may isolate the key performance parameters fundamental to the effectiveness of any design, but must rely on empirical results to determine the overall effectiveness of a specific design. As a simple illustration, consider the splash behavior of a single drop. In a laboratory environment with precise instrumentation and high speed photographic equipment, etc., one can examine the dynamic behavior and heat transfer of said drop when it falls, hits a solid surface, shatters and the secondary droplets thus produced are cooled by a flowing gas through sensible heat transfer and mass transfer, i.e. evaporative heat transfer. Take the same environment, and add a multitude of drops of differing size. Each will fall at a different speed, depending on size. Each will shatter and form different size secondary droplets. Some will combine in midair collisions to form larger droplets. Those reaching the solid surface later due to their slower rate of descent will encounter a surface covered by a film of liquid left from earlier impacting drops which will cushion the impact producing a different secondary drop size. No two discrete experiments will produce the exact same results. The operation of a specific heat transfer media geometry is so complex and unpredictable that extensive experimentation in a continious fluid flow test arrangement where fluid inlet boundary conditions are held constant is the only way that one can verify the feasibility and even superiority of features. One simply cannot combine known features of prior art designs to obtain an analytically predictable result. In this art, each heat transfer media design exhibits different and unpredictable performance characteristics which are dependent on the placement and geometry of a given design. Data on comparative performance characteristics must be obtained by test to verify superiority.

Examples of film type fill assemblies are shown in U.S. Pat. No. 2,809,818 patented on Oct. 15, 1957, U.S. Pat. No. 2,986,379 patented on May 30, 1961, U.S. Pat. No. 3,262,682 patented on July 26, 1966, U.S. Pat. No. 3,272,484 patented on Sept. 13, 1966, and U.S. Pat. No. 4,117,049 patented on Sept. 26, 1978. Most of the film type heat transfer media are composed of a plurality of thin, corrugated and specially formed sheets. Assembled, adjacent sheets form cellular passageways where the gas and liquid may flow in counter current relationship to one another. In most configurations, the liquid flows as a thin film adhering to the surface of the sheets and the gas flows uniformly, filling the passageway. U.S. Pat. No. 3,262,682 illustrates one of the more effective film type heat transfer media. All sheets are corrugated and adjacent sheets are oriented and connected such that the corrugations extend at an oblique angle relative to a horizontal plane with every second layer having its corrugations oriented obliquely in one direction. Adjacent and subsequent second layers extend obliquely in the opposite direction. This cellular configuration creates passageways of constantly varying cross section and the passageways in both the horizontal and vertical directions have a serpentine-like shape. These features promote uniformity in the distribution and thickness of liquid films and cause the gas to mix thoroughly as it travels through the serpentine passages.

Among the problems associated with film type packings is that the gas is required to flow through passages which are relatively small in cross section and it is often required to follow a tortuous path while within the confines of the cellular structure. These factors result in relatively high resistance to flow of the gas stream which results in higher energy usage by the gas moving device of the apparatus. Consequently, the application of film type heat transfer media is limited to smaller systems, or large systems where only a few feet of film type packing is required. A further limitation is that the quantity of liquid per unit area must necessarily be limited since otherwise the flowing liquid films on sheet surfaces becomes relatively thick thereby limiting the liquid-gas contact area and impeding heat transfer efficiency. These thick liquid films will also restrict the area of the gas flow passages further increasing resistance to gas flow. Yet another limitation is that the cellular passages, being necessarily small in an effort to obtain maximum liquid surface area in a given volume, can easily plug up if any solid foreign matter or chemical substance with a tendency to precipitate is present in either the liquid or gas. Generally film type packings will have high heat transfer capabilities per unit volume, but the limitations described above, coupled with high unit costs, limit their application in practice.

Splash bar type heat transfer media such as the present invention, generally overcome the limitations of film type media particularly noted above. These designs consist of a plurality of splash bars, supported in a frame or grid wherein said splash bars are placed in a horizontal plane in parallel, spaced apart relationship in multiple rows. The splash bars in adjacent vertical rows are placed in staggered, offset relationship relative to each other. This array is commonly called a splash bar fill assembly. In direct contact heat exchange apparatus where the intended flow of the gas is generally in cross current relationship with the flow of liquid, two general orientations of splash bar fill assemblies are known. The most common type consists of an array of splash bars as described above, wherein the bars are oriented such that gas flow is generally perpendicular to the longitudinal axis of the individual bars. The vertical dimension of bars disposed in this orientation presents an obstruction to gas flow and of necessity splash bars designed primarily for this orientation should have a relatively low and aerodynamically efficient profile in the transverse direction to minimize the resistance to gas flow thereby minimizing the amount of energy required to induce gas flow through the apparatus. Prior art examples of splash bar designs oriented with the longitudinal axis of the bar perpendicular to gas flow have transverse shapes which generally demonstrate either a compromise in the strength of the splash bar, or project an aerodynamically inefficient profile in the gas flow direction are shown in U.S. Pat. No. 3,389,895 issued June 25, 1968, U.S. Pat. No. 3,468,521 issued Sept. 23, 1968 and U.S. Pat. No. 3,647,191 issued on Mar. 7, 1972. An improved cross flow splash bar overcoming these limitations is described and illustrated in my copending application Ser. No. 496,931 entitled Cooling Tower Spash Bar Method and Apparatus filed May 23, 1983, now U.S. Pat. No. 4,439,378 issued Mar. 27, 1984.

U.S. Pat. No. 3,389,895 shows splash bars intended for the above described orientation with open base triangular and rectangular transverse profiles and perforate surfaces, both of which present large and aerodynamically inefficient projected areas in the direction of gas flow. The same is true of the M-shaped open base profile shown in U.S. Pat. No. 3,647,191. In addition to the higher resistance to gas flow, these designs also have limitations in that gas deflected by the blunt projected area is directed away from at least part of the major splash surface of the profile and intimate mixing of gas and liquid is thereby impeded to some extent. Further, these profiles pay little or no attention to the promotion of uniformity in the distribution of liquid. Liquid tends to concentrate in certain specific areas in the fill assembly matrix due to the geometry of individual splash bars and their tendency to redirect liquid to specific areas. In addition, these profiles have only a small bearing surface area at points where bars rest on supporting grids. This results in excessive wear at these bearing points with a substantial shortening of the useful life of the splash bar since the profile eventually wears through at these contact points.

Splash bar configurations specifically designed for an orientation where the gas flow is parallel to the longitudinal axis overcome some of the limitations noted above and generally offer overall less resistance to gas flow. Typical examples are found in U.S. Pat. No. 2,497,389 issued Feb. 14, 1950, U.S. Pat. No. 3,758,088 issued Sept. 11, 1977, U.S. Pat. No. 4,020,130 issued Apr. 26, 1977, U.S. Pat. No. 4,133,851 issued Jan. 9, 1979 and U.S. Pat. No. 4,181,691 issued Jan. 1, 1980.

U.S. Pat. Nos. 2,497,389 and 3,758,088 show planar and non-planar sine wave fill members respectively, oriented with the longitudinal axis of the fill member parallel to the direction of gas flow. These profiles have no perforate openings and thus lack the ability to fragment liquid by shearing as liquid passes through the perforate surfaces embodied in other designs.

Designs with perforate surface sections such as those shown in U.S. Pat. Nos. 4,020,130, 4,133,851 and 4,181,691 overcome this limitation, but still do not provide the advantages of the present invention. In particular, the profiles shown in U.S. Pat. Nos. 4,020,130 and 4,181,691 incorporate horizontal perforate surfaces which provide the main means for splash and mechanically induced liquid fragmentation and dispersion. Said horizontal perforate strips in these designs are connected to vertical perforate and imperforate strips at both transverse edges of the horizontal perforate strips. The vertical strips serve to connect these sections to the rest of the profile shape and to provide strength and lateral stability to the outer edge of the perforate horizontal sections of said profiles. In profile sections where these vertical strips extend upward from the horizontal surface an open U shaped channel is presented to falling liquid which can cause a portion of the liquid impacting the horizontal surface to be trapped in the trough thus formed. While this trapped liquid will eventually drain through the perforate surface, the formation of thick liquid films on the horizontal surface will severely diminish the effectiveness of splash induced liquid fragmentation on said surfaces. In addition some of this liquid will migrate down the longitudinal axis of the splash bar in the direction of gas flow. Further, liquid passing through the holes and/or overflowing the vertical side strips will continue their fall in the form of heavy streams as opposed to droplets. These factors have a negative impact on splash effectiveness and the uniformity of water distribution throughout the splash bar matrix area. The contact surface area and performance is reduced from what might otherwise be achieved.

The splash bar profiles taught in U.S. Pat. No. 4,133,851 overcome these problems to some extent by incorporating only one vertical perforate or imperforate strip in the profile design and by positioning said vertical strip parallel to the longitudinal axis of the bar. Said vertical strip is positioned either at the transverse centerline, or at a single transverse edge of the horizontal, perforate surface of the bar. Further the edges of both the vertical and horizontal strips includes a bevel or skirt whose purpose is to direct any impinging liquid toward the horizontal splash surface of said bar, or the horizontal surface of other splash bars located below and laterally offset in the splash bar assembly matrix. This profile, while improving on the liquid splash and distribution problems noted above, still exhibits liquid film build up in certain areas and voids in the liquid distribution pattern. These effects are greatest when the vertical strip is located at the transverse centerline of the profile. Beveled edges at the top of this vertical strip actually direct liquid away from the center of the splash bar thereby creating a small but distinct void in liquid distribution directly below the splash bar in this area. Further, these beveled edges make it physically impossible to perforate the horizontal surface close to the vertical strip thereby creating an imperforate area where liquid still accumulates, forming a thicker liquid film on the top surface which spreads outward from this area. In addition, the improvements this profile achieves are obtained only with some compromise in structural strength. Vertical strips and the beveled skirts provide some functional advantages as noted above, but also must be relied upon to provide structural strength and rigidity to the splash bar. Due to the shape and location of these elements, the profiles taught generally lack lateral strength and stability if the transverse dimension of the horizontal perforate surface between the vertical strip and opposite transverse edge of the profile exceeds a nominal limit. The only ways to overcome this structural weakness is either to increase the thickness of the profile or to reduce the transverse dimension of the splash bar. Either of these solutions will result in a loss in performance or the ultimate use of more material to affect the desired heat transfer capability. Limiting the size of the bar in the transverse direction reduces the size of the horizontal perforate surface thereby reducing the effective surface available for fragmentation of liquid on a given bar.

While the differences in the various splash bar designs found in the prior art may appear subtle, those skilled in the art will recognize that the geometric shape and relative position of various elements are highly significant in terms of their impact on splash effectiveness, liquid distribution, fragmentation and gas distribution/energy losses as well as structural strength. These differences are magnified by the fact that a typical splash bar fill assembly area contains a large number of individual splash bars, each of which influences the liquid/gas dynamics and performance of its neighbors and the overall performance of the heat transfer unit as a whole which cannot be predicted from the performance capabilities of prior art designs. Further, the strength, durability and cost are major considerations that cannot be overlooked. Clearly, much is yet to be done to obtain the ultimate functional relationship between gas and liquid in a splash bar design and assembly matrix while at the same time minimizing resistance to gas flow and providing adequate strength.

DISCLOSURE OF THE INVENTION

The present invention relates to an improved method and apparatus for promoting the transfer of heat in a direct contact heat exchange apparatus designed for crossflow gas-liquid flow relationship by means of a splash bar design and assembly matrix.

Accordingly a primary objective is to provide a splash bar design that substantially increases the liquid surface contact area of a falling liquid by both splash and mechanically induced liquid fragmentation.

Another objective is to improve splash and fragmentation effectiveness by minimizing the build up of liquid film thickness on primary splash surfaces.

Another objective is to provide a splash bar that promotes uniformity in the distribution of both a liquid and gas on or near individual splash bars and throughout the fill matrix assembly area.

Another objective is to increase liquid-gas contact time.

Yet another objective is to provide a splash bar with an aerodynamically efficient profile such that said splash bar will provide intimate mixing of gas and liquid and minimium resistance to gas flow when it is oriented with the longitudinal axis parallel to the gas flow direction.

Yet another object of this invention is to provide a substantial increase in the durability and structural strength of the splash bar in all directions when hanging in a grid support system.

A final object of the invention in to provide a means for connecting said splash bar to the vertical elements of the supporting grids while minimizing interference with liquid distribution throughout the fill assembly matrix.

Broadly stated, the present invention, to be described in greater detail below, is directed to a splash bar which incorporates the objects and advantages set forth above in a matrix assembly comprised of a plurality of said longitudinally extended splash bars positioned in horizontal, side by side spaced apart relation in a plurality of vertical, spaced apart rows where splash bars in adjacent vertical rows are spaced in horizontal offset relationship to those immediately above and below. Each splash bar is comprised of three horizontal, essentially flat, longitudinally extended perforate surfaces where the center horizontal perforate surface is positioned vertically higher than the horizontal perforate surfaces on either side. Said horizontal surfaces are connected at interior transverse edges by means of a pair of substantially vertical perforate or imperforate strips. Perforations in each of said horizontal perforate sections are positioned in a distinct and precise pattern wherein the solid material areas between adjacent perforations are of uniform size and shape and equally spaced in both transverse and longitudinal directions. Further, said hole patterns are also uniquely located to establish a symetrical and generally uniform hole pattern relationship between adjacent horizonal perforate surfaces at different elevations that minimizes the imperforate area immediately adjacent to the vertical connecting strip where it intersects the lower horizontal surface. The object of providing a means for connecting the splash bar to the vertical elements of the support grid is accomplished by means of periodic and specially shaped notches located in opposing pairs at the outermost edges of the outwardly extending horizontal perforate strips. Said notches engage vertical elements of the supporting grids in the fill assembly matrix.

Expressed in another way the invention is directed to a method and apparatus first for causing a vertically falling liquid to encounter a central horizontal perforate surface which causes a portion of said liquid to be fragmented by splashing on the imperforate sections of said surface, and the balance of said liquid to be fragmented by shear forces as it passes through the perforations of said surface. That portion of liquid passing through the top perforate surface continues its fall until it encounters another splash bar. That portion of liquid having impinged on the solid sections of said central horizontal section are shattered into smaller droplets which are projected upward and outward from the point of impact. Said secondary droplets thereafter continue their fall, joining the as yet undisturbed droplets from above as they encounter either the same or laterally adjacent horizontal perforate surfaces where the same splash/shear fragmentation phenomenon is repeated. Secondly, said method and apparatus uniformly distributes and effectively drains liquid accumulating on horizontal surfaces of said apparatus thereby minimizing the thickness of the liquid films thereon and promoting an increase splash effectiveness on said surfaces. Thirdly, the method and apparatus that presents a symetrical, balanced liquid dispersion pattern transversely, thereby promoting uniformity and intimate mixing of gas and liquid when gas flow is directed parallel to the longitudinal axis of said apparatus. And finally the method and apparatus provide exceptional structural strength, and dimensional stability in combination with the above.

The splash bar of the present invention creates substantially greater liquid fragmentation and hence greater liquid contact surface area than prior art splash bar configurations. This is accomplished by causing a larger percentage of the splash induced secondary droplets to again re-encounter the same splash bar at a different location. Equally important is the improvement in the extent and efficiency of splash induced fragmentation obtained by minimizing the thickness of liquid films on splash inducing surfaces through the new and essentially constant geometric relationships between perforate and imperforate sections over the entire splash bar surface. Further, the aerodynamically efficient shape of the splash bar in the horizontal plane of gas flow improves the intimate mixing of gas and liquid beyond what is possible with other known splash bars and does so with minimium gas flow energy losses and without compromising the strength of the splash bar.

Other features and objects of the invention will become apparent to those skilled in the art as the invention is further disclosed. The invention is further described in terms of its application to the mechanical draft crossflow cooling towers, but those skilled in the art will recognize its applicability to natural draft or hyperbolic cooling towers and other direct contact heat and mass transfer apparatus where gas and liquid flow in cross current relationship.

IN THE DRAWINGS

Figure 1:
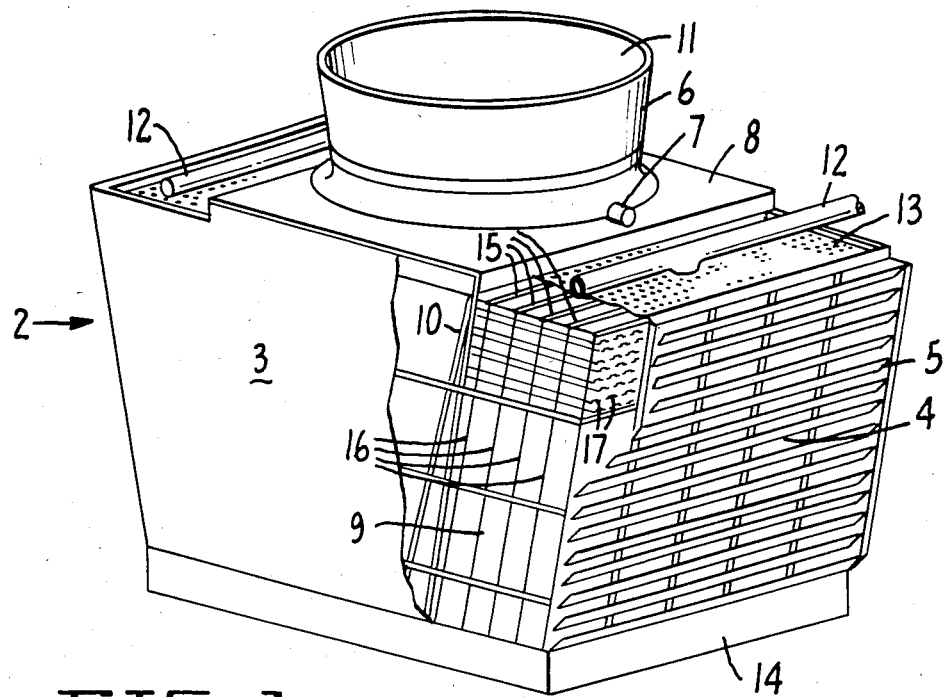
FIG. 1 is an isometric view of a typical mechanical draft, crossflow water cooling tower cell.

FIG. 1 illustrates a typical induced draft crossflow cooling tower 2, having two sides 3 closed and two sides 4 open with the open sides acting as the atmospheric air intakes for the cooling tower. The open sides are fitted with air intake louvers 5 whose primary purpose is to diminish the effects of high winds while keeping water contained within the tower during such occurances and during times when the fan is off. The cooling tower has the usual induced draft axial flow fan (not shown), fan shroud 6, and fan drive motor 7 located on the enclosed top deck 8; said induced draft fan draws air through the intake louvers 5 which then travels horizontally through the fill assembly area 9, through the drift elimination section 10, and finally is drawn vertically upward through the fan and is thereafter discharged at the top of the fan stack shroud 11.

The tower is equipped with the usual hot water distribution piping system 12 which distributes hot water to the hot water basin 13. Nozzles located in the floor of the hot water basin 13 spray and distribute water over the entire top of the fill assembly area 9 after which the water falls by gravity through the fill assembly area 9 being finally collected in the cold water basin 14 at the bottom of the tower.

Figure 2:
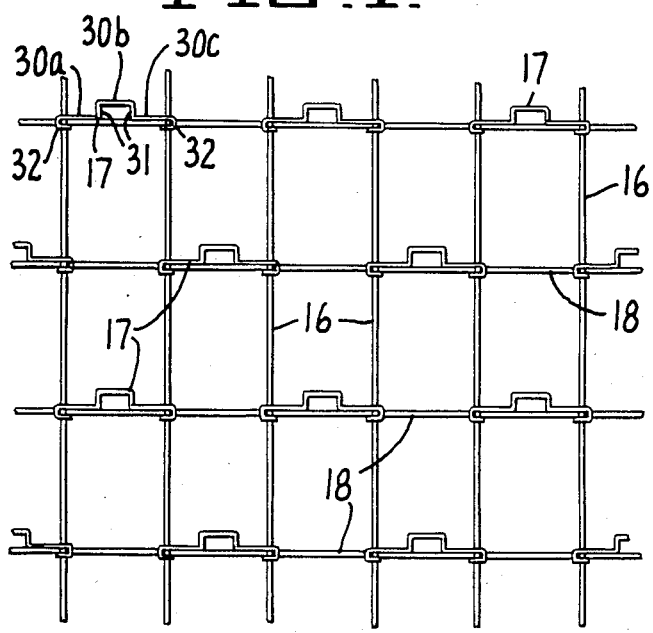
FIG. 2 is an end view of a portion of the fill assembly area matrix showing the splash bar support grids and splash bars therein.
Figure 3:
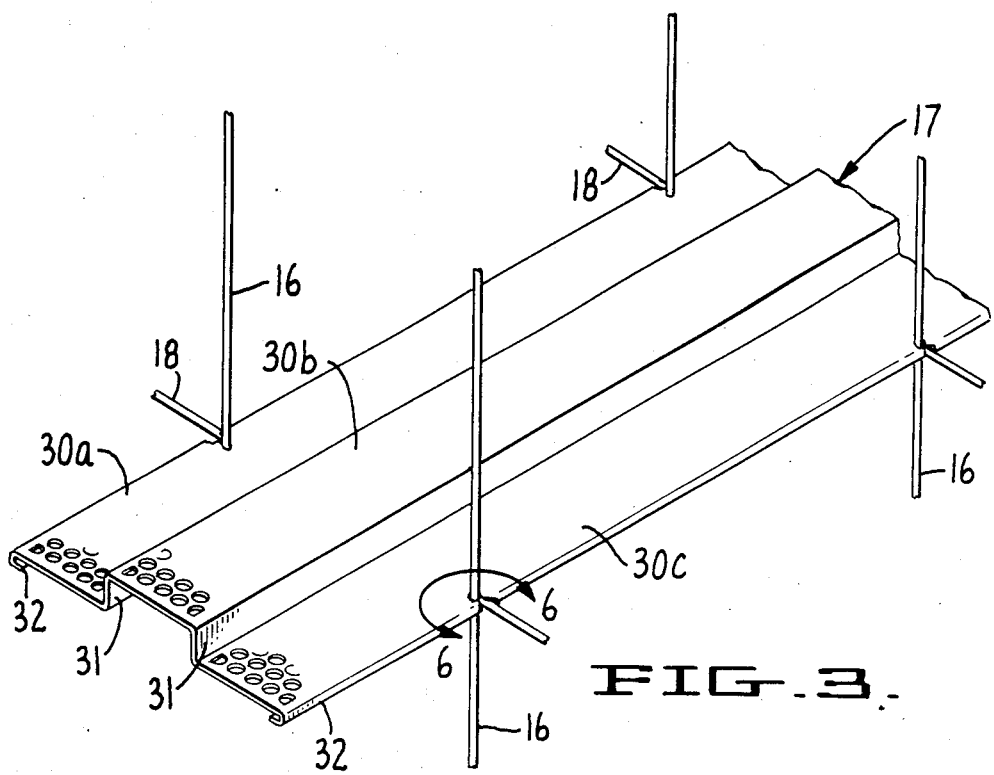
FIG. 3 is an isometric fragmentary view of the splash bar support grid with a splash bar lying therein.

Referring to FIGS. 2 and 3 in conjunction with FIG. 1 it is seen that the fill assembly area 9 is comprised of grid support beams 15 attached to the conventional cooling tower structure at the top and at intermediate heights as may be appropriate. The splash bar support grids 16 are suspended from support beams 15 and they in turn provide support for individual splash bar member 17 which are supported periodically along their length by the horizontal elements 18 of the support grids 16. The splash bar members 17 are positioned in the support grids 16 in horizontal, spaced apart relationship in each row as shown in FIG. 2 with splash bars in adjacent rows located in offset relationship to splash bars in rows immediately above and below. FIG. 1 illustrates a fill assembly orientation where the splash bars are oriented with their longitudinal axis parallel to the direction of air flow.

Figure 4:
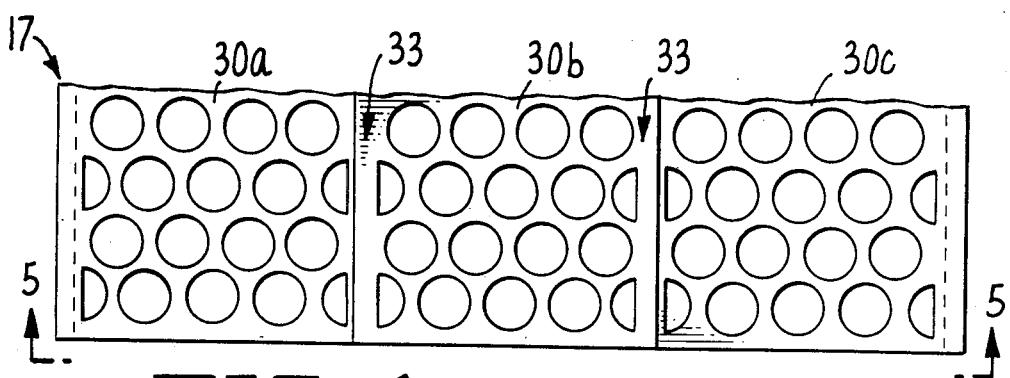
FIG. 4 is a partial, end plan view showing the construction details of a splash bar of the preferred embodiment of the present invention.
Figure 5:
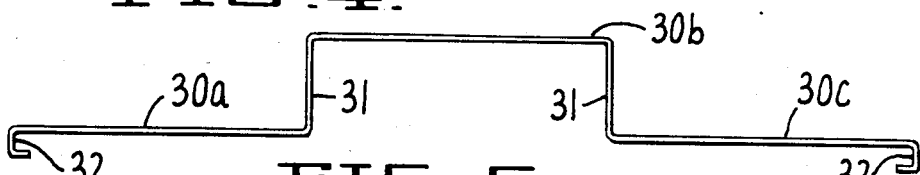
FIG. 5 is an end view of the splash bar shown in FIG. 4 taken along line 5—5 in the direction of the arrows.

A preferred embodiment of the splash bar members 17 of the present invention is illustrated in FIGS. 3–5. The splash bar is composed of three horizontal, generally flat, elongated perforate strips or elements 30a, 30b and 30c, connected at their interior transverse extremes by a pair of elongated, generally vertical, flat strips or elements 31 such that the center or upper flat perforate strip 30b is elevated relative to the two exterior or lower flat perforate strips 30a and 30c. An elongated, imperforate rolled edge or lip 32 is attached to the extreme outward transverse edges of said exterior flat perforate strips 30a and 30c, which act to provide additional structural strength and stiffness to the transverse profile thus formed.

The perforations in the flat, horizontal elongate sections 30a, 30b and 30c of the preferred embodiment are circular or semi-circular in shape and are positioned such that the geometric center of said holes, for any three adjacent holes not all in a straight line, are located with their circular centers at the apexes of equilateral triangles. This pattern is repeated in both the transverse and longitudinal directions in each horizontal perforate strip thereby creating a uniform and equally spaced hole pattern in both directions. Semi-circular holes are employed in the transverse first and last rows extending longitudinally of the perforate pattern in each horizontal perforate strip to eliminate any imbalance in the ratio of perforate to imperforate surface area near transverse extremes of individual horizontal sections. This is particularly important near the intersection of horizontal surfaces 30a and 30c, with vertical connecting strips 31, where a relatively large area of imperforate surface would otherwise occur and where a thicker liquid film would otherwise occur because flow of liquid laterally inward of the splash bar elements is prevented by the vertical strips 31. Said hole patterns in adjacent, horizontal perforate sections are positioned symetrically relative to a vertical plane, located parallel to, and slightly offset laterally inward of the vertical strips 31. Without this specific offset the pattern otherwise established would create a fully symetrical and balance perforate pattern over the full width of the splash bar. This slight offset is incorporated in the perforate pattern specifically to create a small elongated imperforate strip 33 in the transverse extremes of the top horizontal perforate strip 30b thereby creating slightly more splash surface in this critical transition region between adjacent horizontal surfaces which are at different elevations, thereby eliminating any tendancy for liquid to accumulate on the lower horizontal strip adjacent to the vertical strip 31 at the two locations where this transition occurs on the instant invention.

Figure 6:
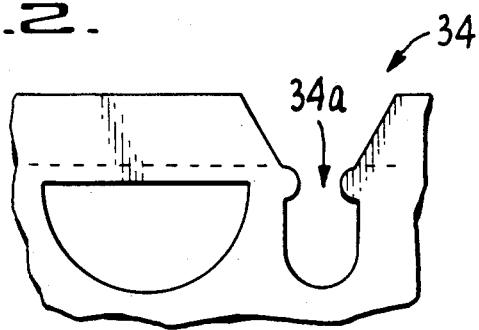
FIG. 6 is an enlarged plan view of a portion of the structure shown in FIG. 5 and delineated by line 6—6.

As best illustrated in FIG. 6, the splash bar members 17 have slots 34 cut into the extreme outward transverse edges of the exterior strips 30a and 30c. The slots 34 are spaced apart along the length of the slash bar by the distance between the grids 16 for locking the splash bars in place in the fill assembly 9. The slots narrow down approximatley halfway along their length at 34a and are chamfered from the narrow region to the open end permitting the grid elements to slide into the slots 34 for capture beyond the narrow region.

The height of each flat strip or element 31 is less than the width of any of the perforate strips or elements 30A, 30B, and 30C. In the preferred embodiment illustrated in the drawing the height of each flat strip 31 is less than half the width of any of the perforate elements 30A, 30B and 30C.

Figure 7:
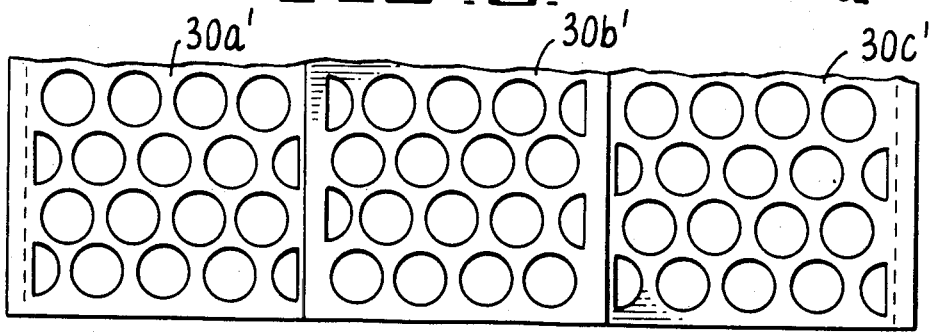
FIG. 7 is similar to FIG. 5 but illustrating an alternative embodiment of the present invention.

An alternative embodiment of the present invention is illustrated in FIG. 7. As illustrated there, the hole pattern for the upper center strip 30b' is shifted by one row with respect to the hole pattern for the lower exterior strips 30a' and 30c' from that pattern shown in FIG. 5 so that the semi-circular holes of the upper strip 30b' are immediately adjacent to full circular holes in the lower strips 30a' and 30c'. This construction also reduces the liquid film thickness on the imperferate strip 32' that might run down the vertical strips 31' thereby creating a thick liquid film in the region adjacent to the closest full circle holes near the edge of the lower strip.

Those skilled in the art will recognize that specific fluids exhibit different viscosities and other physical characteristics which may require different hole sizes and shapes, different hole center distances and different overall transverse dimensions within the scope and teaching of the present invention to obtain optimum results.

I claim:

1. For use with a liquid cooling tower having a hot water distributor for distributing water onto a splash bar assembly structure, a cold water basin and means for inducing movement of air therebetween, a combination therewith of splash bar assembly structure comprising, a series of elongated generally horizontal splash bar members;

means supporting said splash members in the space between the hot water distributor and said cold water basin in horizontal and vertical spaced relationship;

said splash bar members having their longitudinal axes positioned substantially horizontal;

each of said splash bar members having elongate substantially flat, perforated surfaced elements in parallel and vertically spaced apart relation; vertical strip elements spacing said perforated surface elements apart vertically by a distance less than the width of said splash bar members;

the perforations of said surface elements arranged in staggered rows and including semi-circular holes in alternate rows along the edges of said surface elements with the straight side of said semi-circular holes aligned with, and adjacent to said edges.

2. A method of cooling a liquid in a cross-flow cooling tower including a matrix of longitudinally extending splash bars each having a perforated substantially flat upper horizontal central strip and a pair of elongate perforated horizontal strips along the lateral edges of said central strip, said method comprising the steps of:

flowing air horizontally through said matrix along the longitudinal axes of said splash bars;

splashing warm liquid through said matrix in cross-flow within the said air flow;

directing a first portion of said liquid on said upper central strip;

fragmenting a first subportion of said first portion by splashing on imperforate sections of said central strip;

fragmenting a second subportion of said first portion by shear forces as said second subportion passes through said central strip;

further fragmenting certain of said first fragmented subportion by splashing on imperforate sections of said central strip or said lateral strips before said first fragmented subportion can be carried off by horizontal cross-flowing air;

directing a second portion of said liquid on said lateral strips;

fragmenting a first subportion of said second portion by splashing on imperforate sections of said lateral strips;

fragmenting a second subportion of said second portion by shear forces as said second subportion passes through said lateral strips;

distributing liquid across the imperforate surfaces of said central and said lateral strips;

draining liquid from the imperforate surfaces of said central and said lateral strips; and repeating said flowing, splashing, directing, fragmenting, distributing and draining steps through said matrix for maximum heat exchange between said liquid and air.

3. For use with a liquid cooling tower having a hot water distributor for distributing water onto a splash bar assembly structure, a cold water basin and means for inducing movement of air therebetween, a combination therewith of splash bar assembly structure comprising, a series of elongated generally horizontal splash bar members;

means supporting said splash bar members in the space between the hot water distributor and said cold water basin in horizontal and vertical spaced relationship;

said splash bar members having their longitudinal axes positioned substantially horizontal;

each of said splash bar members having an elongate substantially flat, perforated upper surface element;

a pair of substantially flat, perforated lower surface elements;

an elongate vertical strip element at each side of said splash bar element and connected to the adjacent transverse extreme edges of said upper and lower surface elements holding said horizontal surface elements in parallel and vertically spaced-apart relation;

each of said vertical strip elements having a height less than the width of any said splash bar members;

the perforations of said surface elements arranged in staggered rows with semi-circular holes in alternate rows along the edges of said upper and lower elements with the straight side of said semi-circular holes aligned with and adjacent to, the edges of said upper and lower elements.

4. The splash bar assembly of claim 3 including imperforate strips along the lateral edges of said upper element.

5. The splash bar assembly of claim 4 wherein each of said strip elements projects laterally outwardly of the interior of said splash bar member.

6. A cooling tower splash bar comprising a first upper elongate perforated flat horizontal surface element;

second and third lower elongate perforated flat horizontal surface elements located respectively along the lateral edges of said first element and positioned substantially parallel to and vertically below said first surface element;

upwardly inclined fourth and fifth elongate surface elements respectively connecting the elongate edges of said second and third surface elements to the transverse extreme edges of said first element;

said upwardly inclined fourth and fifth elongate surface elements each having a height less than the width of said first, second, and third surface elements;

the perforations of said first, second, and third members permitting liquid passage therethrough and preventing substantial build-up of liquid on said splash bar on horizontal surfaces with the perforations of said first, second, and third elements comprising staggered rows of circular or semi-circular holes with the geometric center of any three adjacent holes locating at the apexes of an equilateral triangle in both transverse and longitudinal directions, said perforations including semi-circular holes in alterate rows along the edges of said first, second, and third elements with the straight side of said semi-circular holes aligned with, and adjacent to, the edges of said upper and lower elements.

7. The splash bar assembly of claim 6 including imperforate strips along the lateral edges of said first element.

* * * * *